United States Patent
Tseng et al.

(10) Patent No.: US 11,829,314 B2
(45) Date of Patent: Nov. 28, 2023

(54) CHARGING SYSTEM AND CONTROL METHOD THEREOF WHERE A SINK TERMINAL TRANSMITS A REQUEST MESSAGE TO A SOURCE TERMINAL WHILE THE SOURCE TERMINAL TRANSMITS A SOURCE MESSAGE

(71) Applicant: RICHTEK TECHNOLOGY CORP., Hsinchu County (TW)

(72) Inventors: Tzu-Hsuan Tseng, Pingtung County (TW); Tzu-Hsien Chuang, Hsinchu County (TW); Sheng-Chun Lin, Pingtung County (TW); Hao-Chun Yang, Taoyuan (TW); Chien-Chih Huang, Hsinchu County (TW); Heng-Min Chang, Miaoli County (TW); Tsung-Jung Wu, Kaohsiung (TW); Yen-Tung Hung, Hsinchu County (TW)

(73) Assignee: RICHTEK TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 17/867,665

(22) Filed: Jul. 18, 2022

(65) Prior Publication Data
US 2023/0267090 A1 Aug. 24, 2023

(30) Foreign Application Priority Data
Feb. 24, 2022 (TW) .................................. 111106749

(51) Int. Cl.
*G06F 13/40* (2006.01)

(52) U.S. Cl.
CPC ...... *G06F 13/4072* (2013.01); *G06F 13/4022* (2013.01)

(58) Field of Classification Search
None
See application file for complete search history.

(56) References Cited

U.S. PATENT DOCUMENTS

| | | | |
|---|---|---|---|
| 10,252,631 B2 | 4/2019 | Ricci | |
| 2013/0010848 A1* | 1/2013 | Shimizu | H04N 21/43637 375/295 |

(Continued)

FOREIGN PATENT DOCUMENTS

| | | |
|---|---|---|
| CN | 106655488 A | 5/2017 |
| TW | 201926180 A | 7/2019 |

*Primary Examiner* — Henry Tsai
*Assistant Examiner* — Aurangzeb Hassan
(74) *Attorney, Agent, or Firm* — Winston Hsu

(57) ABSTRACT

A charging system includes a source terminal and a sink terminal. The control method of the charging system includes transmitting a bus voltage by the source terminal, determining whether the sink terminal has entered a sink attached state when the sink terminal receives the bus voltage, enabling a message transceiver of the sink terminal if the sink terminal has entered the sink attached state, transmitting a source message to the transceiver of the sink terminal by the source terminal, transmitting a request message to the source terminal by the message transceiver of the sink terminal while the source terminal transmits the source message, and continuing to enable a communication function for communicating with the sink terminal and continuing to transmit the bus voltage to the sink terminal by the source terminal when the source terminal receives the request message.

16 Claims, 6 Drawing Sheets

(56) References Cited

U.S. PATENT DOCUMENTS

| | | | |
|---|---|---|---|
| 2013/0290765 A1* | 10/2013 | Waters | G06F 1/263 |
| | | | 713/340 |
| 2017/0136894 A1 | 5/2017 | Ricci | |
| 2018/0004277 A1* | 1/2018 | Matsui | G06F 9/06 |
| 2018/0219399 A1 | 8/2018 | Balakrishnan | |
| 2021/0209053 A1* | 7/2021 | Morita | G06F 13/4072 |

* cited by examiner

CHARGING SYSTEM AND CONTROL METHOD THEREOF WHERE A SINK TERMINAL TRANSMITS A REQUEST MESSAGE TO A SOURCE TERMINAL WHILE THE SOURCE TERMINAL TRANSMITS A SOURCE MESSAGE

BACKGROUND OF THE INVENTION

1. Field of the Invention

The disclosure is related to a charging system and control method thereof, where a sink terminal transmits a request message to a source terminal while the source terminal transmits a source message so that the source terminal can continue to transmit a bus voltage.

2. Description of the Prior Art

When performing charging, power can be transmitted from a source terminal to a sink terminal. For example, the source terminal can include an adapter, and the sink terminal can be set in a handheld device to be charged.

According to the specification of Power Delivery, when the sink terminal just receives power or is just turned on, the sink terminal has no ability to communicate with the source terminal. Therefore, when the control program of the sink terminal has not been awakened yet to enter a controllable state, the sink terminal cannot reply to the communication signal sent by the source terminal.

Since the sink terminal cannot reply to the source terminal, the source terminal cannot receive a reply signal from the sink terminal, and the source terminal cannot enable the communication function for communicating with the sink terminal. The source terminal will determine the communication is failed and stop sending the communication signal to the sink terminal, and the source terminal can only receive the hard reset command.

After the sink terminal has entered a controllable state, since the source terminal has stopped sending the communication signal to the sink terminal, there is no communication between the sink terminal and the source terminal, and the sink terminal will send the hard reset command to the source terminal for the source terminal to perform a hard reset.

However, after the source terminal has performed hard reset, the source terminal cannot provide power to the sink terminal due to the hard reset operation, so the sink terminal is shut down and restarted. When the source terminal provides power to the sink terminal again, the sink terminal has no ability to communicate with the source terminal again. As a result, the above-mentioned situation keeps repeating, so the sink terminal cannot be charged steadily.

SUMMARY OF THE INVENTION

An embodiment provides a control method for a charging system. The charging system includes a source terminal and a sink terminal. The control method includes transmitting a bus voltage by the source terminal; determining whether the sink terminal has entered a sink attached state when the sink terminal receives the bus voltage; enabling a message transceiver of the sink terminal if the sink terminal has entered the sink attached state; transmitting a source message to the transceiver of the sink terminal by the source terminal; transmitting a request message to the source terminal by the message transceiver of the sink terminal while the source terminal transmits the source message; and continuing to enable a communication function for communicating with the sink terminal and continuing to transmit the bus voltage to the sink terminal by the source terminal when the source terminal receives the request message. The source message is used to query at least one of a voltage and a current corresponding to the sink terminal, and the request message is used to reply at least one of the voltage and the current corresponding to the sink terminal.

Another embodiment provides a charging system including a source terminal and a sink terminal. The source terminal is used to transmit a bus voltage and a source message, and receive a request message. The sink terminal is electrically connected to the source terminal, and used to receive the bus voltage and the source message, and transmit the request message to the source terminal while the source terminal transmits the source message. The source message is used to query at least one of a voltage and a current corresponding to the sink terminal, the request message is used to reply at least one of the voltage and the current corresponding to the sink terminal, and the source terminal continues to enable a communication function for communicating with the sink terminal and continues to transmit the bus voltage to the sink terminal when the source terminal receives the request message.

These and other objectives of the present invention will no doubt become obvious to those of ordinary skill in the art after reading the following detailed description of the preferred embodiment that is illustrated in the various figures and drawings.

DETAILED DESCRIPTION

For dealing with the abovementioned problems, solutions are provided as described below.

Figure 1:
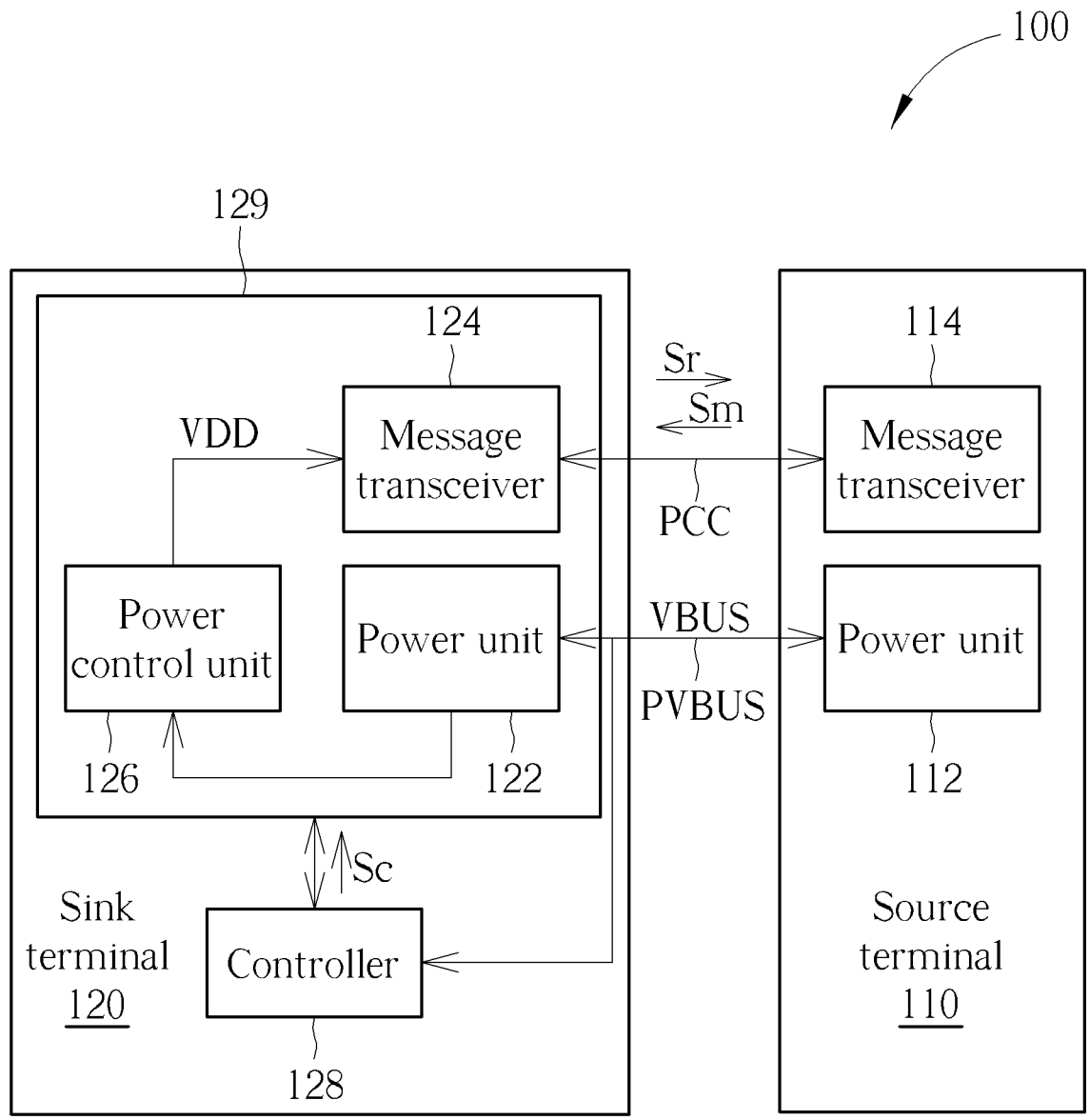
FIG. 1 illustrates a charging system according to an embodiment.

FIG. 1 illustrates a charging system 100 according to an embodiment. The charging system 100 can include a source terminal 110, a sink terminal 120, a configuration channel path PCC and a bus voltage path PVBUS.

The source terminal 110 can be used to transmit a bus voltage VBUS and a source message Sm, and receive a request message Sr. When the source terminal 110 charges the sink terminal 120, the sink terminal 120 can be electrically connected to the source terminal 110 for receiving the bus voltage VBUS and the source message Sm. While the source terminal 110 transmits the source message Sm, the sink terminal 120 can transmit the request message Sr to the source terminal 110.

The source message Sm can be used to query at least one of a voltage and a current corresponding to the sink terminal 120, the request message Sr can be used to reply at least one of the voltage and the current corresponding to the sink terminal 120. For example, the sink terminal 120 can use the request message Sr to request the source terminal 110 to provide a voltage of 5 volts and a current of 3 amps, so the source terminal 110 can charge the sink terminal 120 with the voltage and the current required by the sink terminal 120.

The configuration channel path PCC can be electrically connected to the message transceiver 114 and the message transceiver 124, and transmit the source message Sm and the request message Sr. The bus voltage path PVBUS can be electrically connected to a power unit 112 and a power unit 122, and transmit the bus voltage VBUS.

The source terminal 110 can include the power unit 112 and the message transceiver 114. The power unit 112 can transmit the bus voltage VBUS. The message transceiver 114 can transmit the source message Sm and receive the request message Sr from the sink terminal 120. For example, the message transceiver 114 can include a low-drop regulator for transmitting the source message Sm.

The sink terminal 120 can include a power unit 122, the message transceiver 124, a power control unit 126 and a controller 128. The power unit 122 can receive the bus voltage VBUS to supply power to the sink terminal 120. The message transceiver 124 can receive the source message Sm and transmit the request message Sr to the source terminal 110. For example, the message transceiver 124 can include a low-drop regulator for transmitting the request message Sr.

As shown in FIG. 1, in the sink terminal 120, when the power unit 122 receives the bus voltage VBUS, the power unit 122 can provide a voltage to the power control unit 126. The power control unit 126 can generate a core voltage VDD and provide the core voltage VDD to the message transceiver 124 to enable the message transceiver 124, so the message transceiver 124 can transmit the request message Sr.

As shown in FIG. 1, when the sink terminal 120 receives the bus voltage VBUS, the bus voltage VBUS can power the controller 128. When the controller 128 receives the voltage, the controller 128 can perform a wake-up operation. After the wake-up operation is completed, the controller 128 can use the control signal Sc to control at least one of the power unit 122, the message transceiver 124 and the power control unit 126 of the sink terminal 120. For example, the controller 128 can include a microcontroller unit (MCU).

As shown in FIG. 1, the power unit 122, the message transceiver 124 and the power control unit 126 can be disposed in an integrated circuit (IC) 129. The integrated circuit 129 can be a type-C port controller (TCPC) integrated circuit. The controller 128 can control the integrated circuit 129. According to another embodiment, the power unit 122, the message transceiver 124, the power control unit 126 and the controller 128 can be disposed in a same integrated circuit.

Figure 2:
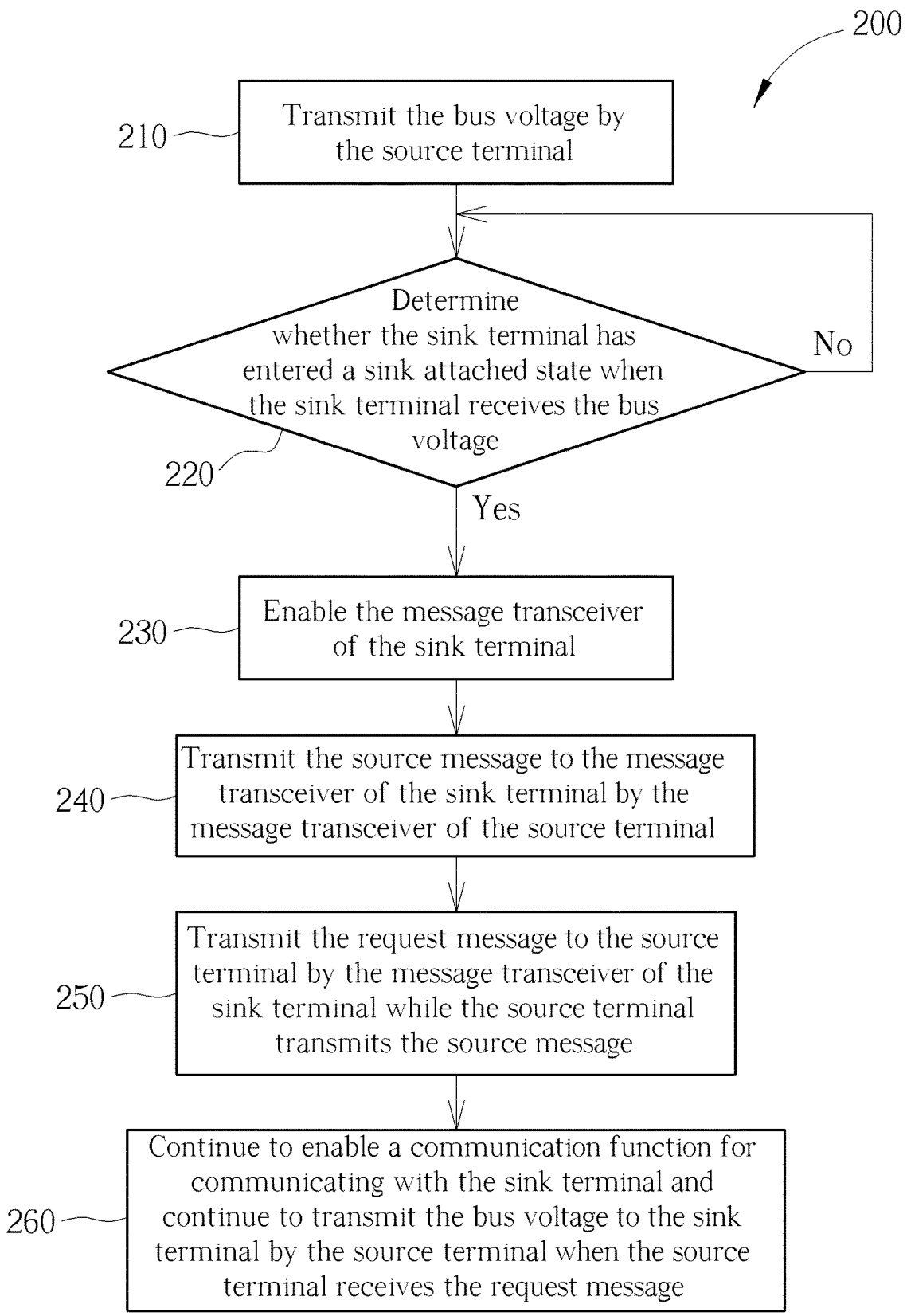
FIG. 2 is a flowchart of a control method for the charging system in FIG. 1.

FIG. 2 is a flowchart of a control method 200 for the charging system 100 in FIG. 1. As shown in FIG. 1 and FIG. 2, the control method 200 can include the following steps.

Step 210: transmit the bus voltage VBUS by the source terminal 110;

Step 220: determine whether the sink terminal 120 has entered a sink attached state when the sink terminal 120 receives the bus voltage VBUS; if so, enter Step 230; otherwise, enter Step 220;

Step 230: enable the message transceiver 124 of the sink terminal 120;

Step 240: transmit the source message Sm to the message transceiver 124 of the sink terminal 120 by the message transceiver 114 of the source terminal 110;

Step 250: transmit the request message Sr to the source terminal 110 by the message transceiver 124 of the sink terminal 120 while the source terminal 110 transmits the source message Sm; and Step 260: continue to enable a communication function for communicating with the sink terminal 120 and continue to transmit the bus voltage VBUS to the sink terminal 120 by the source terminal 110 when the source terminal 110 receives the request message Sr.

In Step 210, when the sink terminal 120 receives the bus voltage VBUS, the sink terminal 120 can be powered. In Step 220, for example, the sink attached state can be the Attached.SNK state specified in the specification of the universal serial bus type-C (USB type-C). In Step 220, whether the sink terminal 120 has entered the sink attached state can be determined by the sink terminal 120, for example, by the abovementioned integrated circuit 129.

In Step 230 to Step 250, when the sink terminal 120 has received the bus voltage VBUS, and the software, hardware and firmware of the controller 128 of the sink terminal 120 have not completed wake-up operations, the message transceiver 124 of the sink terminal 120 can be automatically waken up through the hardware in the sink terminal 120, so the message transceiver 124 can transmit the request message Sr to the source terminal 110. Hence, the sink terminal 120 can avoid to fail to transmit the request message Sr while the source terminal 110 transmits the source message Sm.

In Step 260, since the source terminal 110 receives the request message Sr in time, the source terminal 110 is informed that a device (e.g. the sink terminal 120) is electrically connected to it and is able to communicate with it normally. Hence, the source terminal can continue to enable the communication function for communicating with the sink terminal 120 without turning off the communication function. As a result, the sink terminal 120 can avoid to transmit a hard reset command to the source terminal 110 after failing to communicate with the source terminal 110. Since the source terminal 110 does not perform the hard reset operation, the source terminal 110 can continue to transmit the appropriate bus voltage VBUS according to the request message Sr. As a result, the source terminal 110 can continue to charge the sink terminal 120 without being interrupted. In Step 260, the message transceiver 114 can be continuously enabled so as to continuously enable the communication function with the sink terminal 120.

Figure 3:
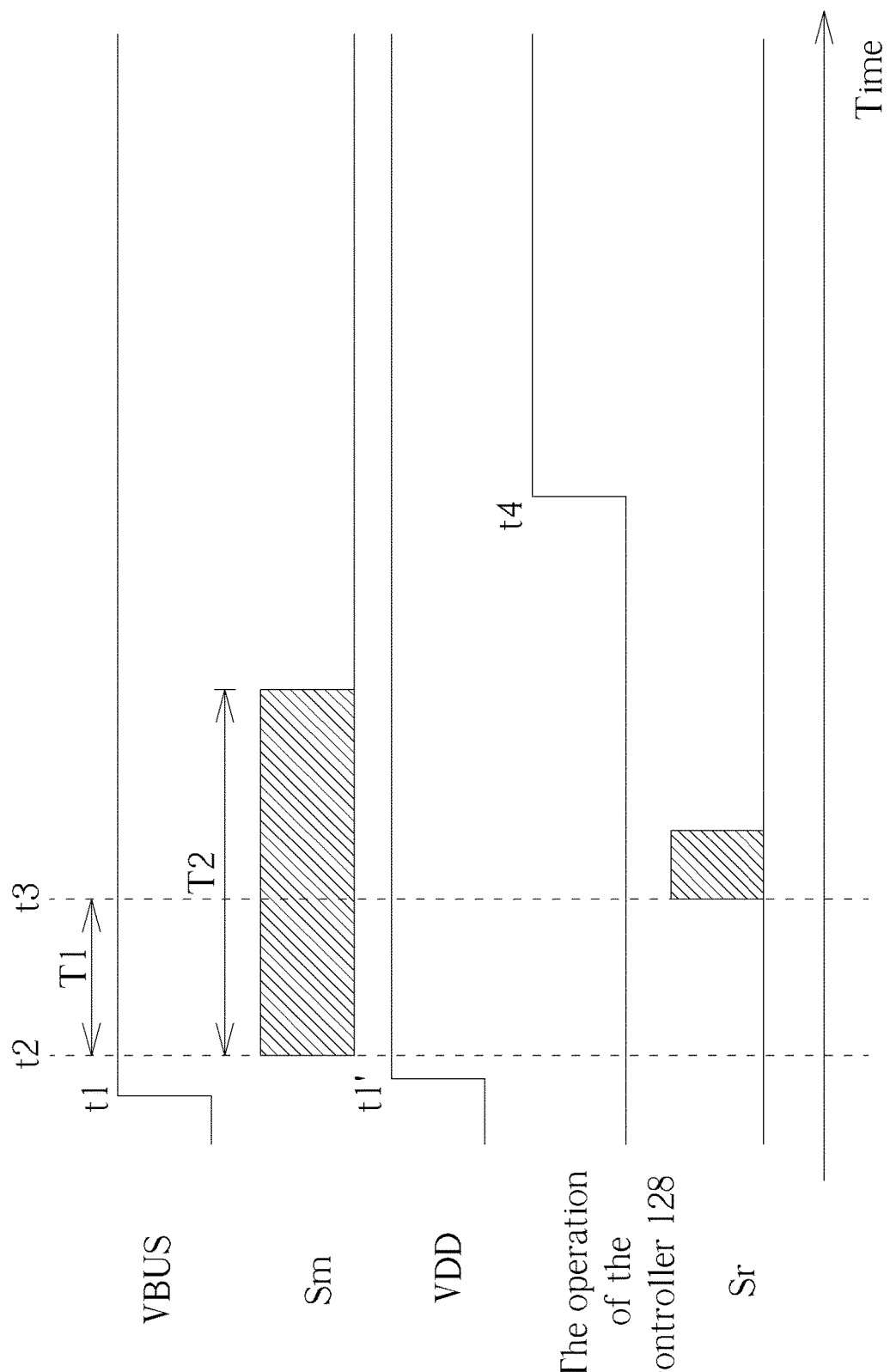
FIG. 3 is a timing diagram of the signals, voltages and operation in FIG. 1 and FIG. 2.

FIG. 3 is a timing diagram of the signals, voltages and operation in FIG. 1 and FIG. 2. In FIG. 3, the horizontal axis is corresponding to time. In FIG. 3, the source terminal 110 can start to transmit the bus voltage VBUS at a first time t1. The source terminal 110 can start to transmit the source message Sm to the sink terminal 120 at a second time t2. The sink terminal 120 can start to transmit the request message Sr to the source terminal 110 at a third time t3. The controller 128 of the sink terminal 120 can complete the wake-up operation at a fourth time t4 and enter a controllable state. The first time t1 can precede the second time t2, the second time t2 can precede the third time t3, and the third time t3 can precede the fourth time t4.

In FIG. 3, a first period T1 between the second time t2 and the third time t3 can be shorter than a second period T2 of transmitting the source message Sm by the source terminal 110. Hence, the sink terminal 120 can transmit the request message Sr while the source terminal 110 transmits the source message Sm, so the source terminal 110 can charge the sink terminal 120 without interruption.

As shown in FIG. 1 and FIG. 3, when the sink terminal 120 receives the bus voltage VBUS at the time t1, and after a short delay, the power control unit 126 can start to provide the core voltage VDD to the message transceiver 124 at a time t1'.

Figure 4:
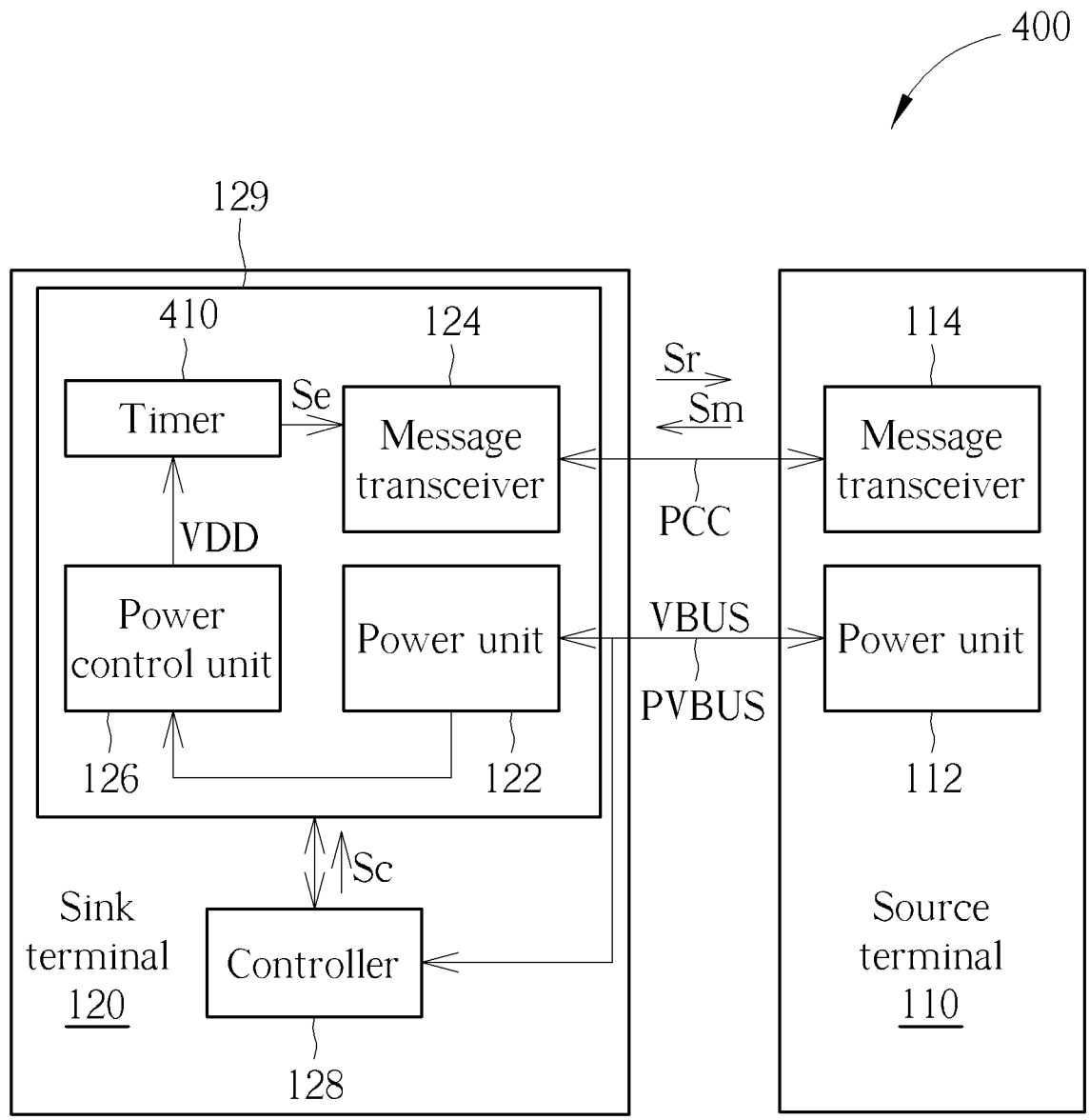
FIG. 4 illustrates a charging system according to another embodiment.
Figure 6:
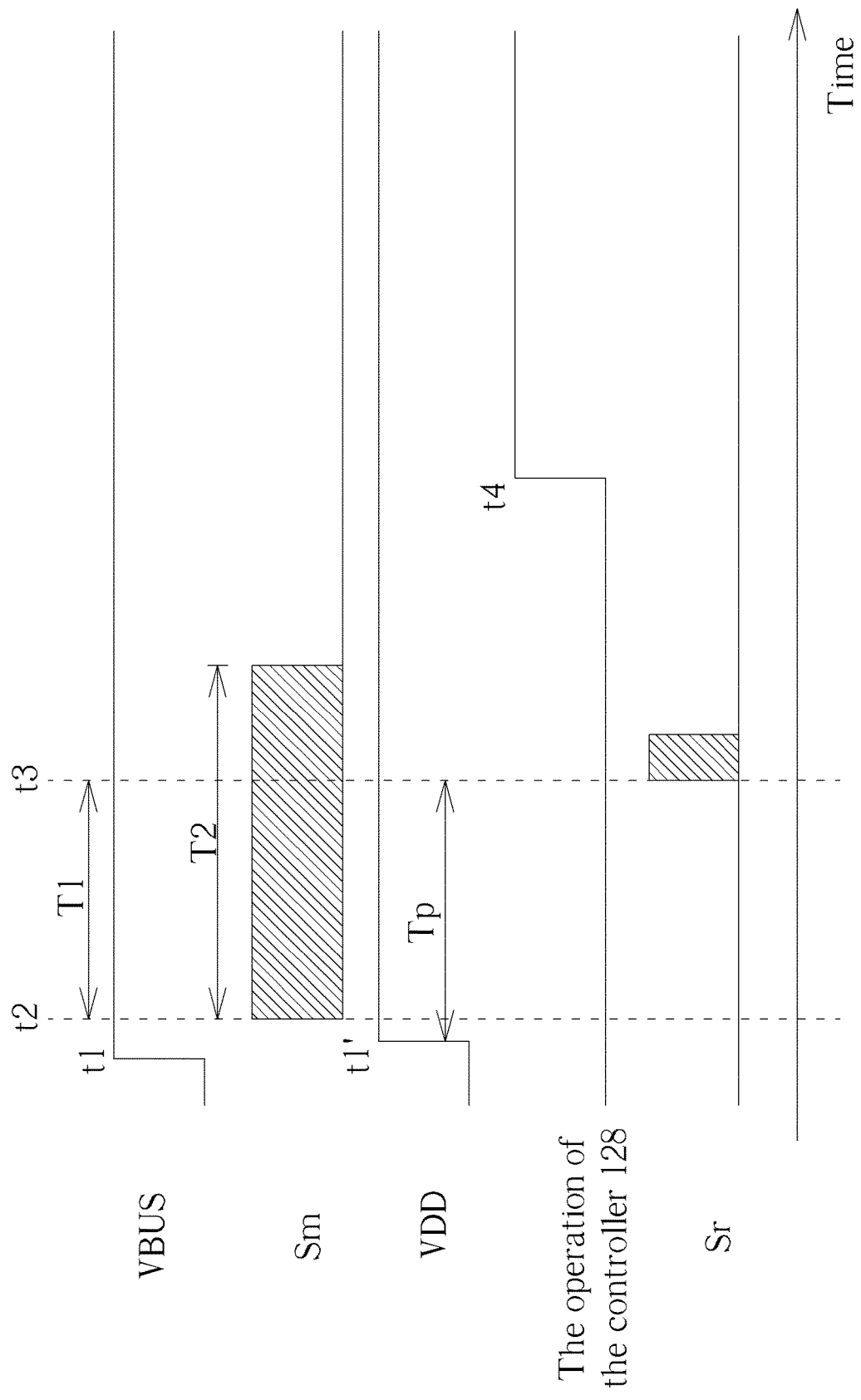
FIG. 6 is a timing diagram of the signals, voltages and operation of the charging system in FIG. 4.

FIG. 4 illustrates a charging system 400 according to another embodiment. The charging system 400 can be similar to the charging system 100 in FIG. 1, and the similarities are not described repeatedly. In charging system 400, the sink terminal 120 can further include a timer 410 electrically connected to the power control unit 126 and the message transceiver 124. After the power unit 122 receives the bus voltage VBUS and the sink terminal 120 has entered the sink attached state (e.g. Attached.SNK state), the timer 410 can time a predetermined period Tp (as shown in FIG. 6). After the predetermined period Tp has elapsed, the timer 410 can transmit an enabling signal Se to enable the message transceiver 124. For example, the timer 410 can include an oscillator to generate and calculate clock cycles for timing.

Figure 5:
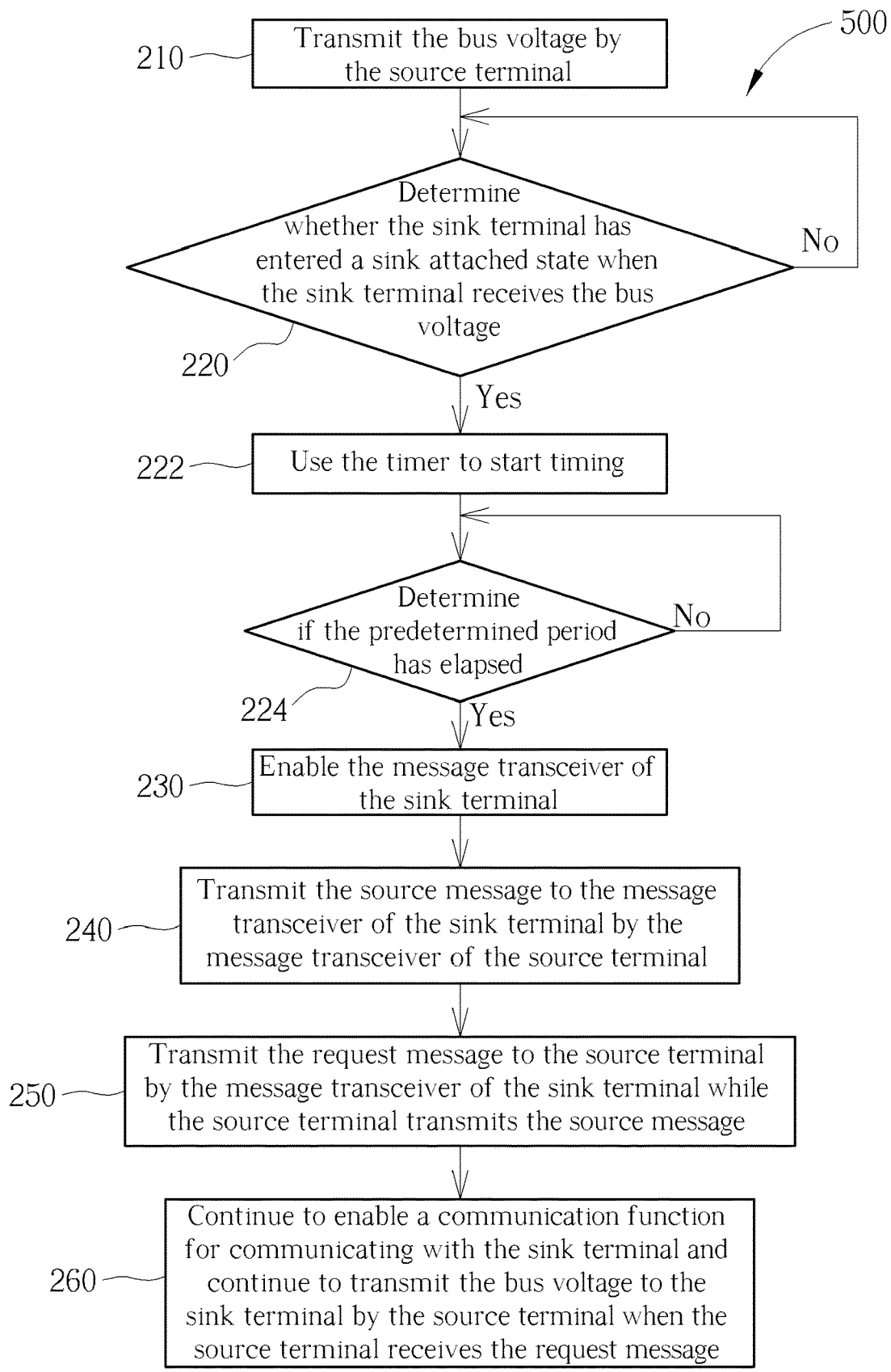
FIG. 5 is a flowchart of a control method for the charging system.

FIG. 5 is a flowchart of a control method 500 for the charging system 400. In FIG. 4 and FIG. 5, the control method 500 can include the following steps.

Step 210: transmit the bus voltage VBUS by the source terminal 110;

Step 220: determine whether the sink terminal 120 has entered a sink attached state when the sink terminal 120 receives the bus voltage VBUS; if so, enter Step 222; otherwise, enter Step 220;

Step 222: use the timer 410 to start timing;

Step 224: determine if the predetermined period Tp has elapsed; if so, enter Step 230; otherwise, enter Step 224;

Step 230: enable the message transceiver 124 of the sink terminal 120;

Step 240: transmit the source message Sm to the transceiver 124 of the sink terminal 120 by the message transceiver 114 of the source terminal 110;

Step 250: transmit the request message Sr to the source terminal 110 by the message transceiver 124 of the sink terminal 120 while the source terminal 110 transmits the source message Sm; and Step 260: continue to enable a communication function for communicating with the sink terminal 120 and continue to transmit the bus voltage VBUS to the sink terminal 120 by the source terminal 110 when the source terminal 110 receives the request message Sr.

The similarities of the control method 200 and 500 are not repeatedly described. Compared with the control method 200, the control method 500 can further include the Step 222 and Step 224 for the timer 410 to perform timing to control the time of receiving the request message Sr by the sink terminal 120.

FIG. 6 is a timing diagram of the signals, voltages and operation in FIG. 4. Compared with FIG. 1 and FIG. 3, the timer 410 is used in FIG. 4, so the message transceiver 124 can be enabled later, and the request message Sr can be transmitted later. For example, as shown in FIG. 6, if the power control unit 126 starts to provide the core voltage VDD at time t1', and the timer 410 starts to perform timing at time t1', the request message Sr can be transmitted after the predetermined period Tp has elapsed.

If the predetermined period Tp is set longer, the sink terminal 120 can transmit the request message Sr later. If the predetermined period Tp is longer, the request message Sr can be transmitted after the booting procedures of the sink terminal 120 and the source terminal 110 are more ready to help with the operations of the system. However, if the predetermined period Tp is too long, the sink terminal 120 cannot send the request message Sr in time while the source terminal 110 sends the source message Sm, and the communication between the source terminal 110 and the sink terminal 120 will therefore fail. Hence, the predetermined period Tp can be shorter than the second period T2 during which the source message Sm is transmitted by the source terminal 110. According to an embodiment, the predetermined period Tp can be between 0 and 6 seconds. According to another embodiment, the predetermined period Tp can be between 0 and 3 seconds.

In summary, by means of the charging system 100, the control method 200, the charging system 400 and the control method 500, the message transceiving function in the sink terminal 120 is automatically enabled through hardware. Hence, the request message Sr is transmitted in time to maintain the communication between the source terminal 110 and the sink terminal 120, and the sink terminal 120 is continuously powered. As a result, the charging flow is improved, and the sink terminal 120 is steadily charged by the source terminal 110.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method for a charging system, the charging system comprising a source terminal and a sink terminal, the control method comprising:

transmitting a bus voltage by the source terminal;

determining whether the sink terminal has entered a sink attached state when the sink terminal receives the bus voltage;

enabling a message transceiver of the sink terminal if the sink terminal has entered the sink attached state;

transmitting a source message to the transceiver of the sink terminal by the source terminal;

transmitting a request message to the source terminal by the message transceiver of the sink terminal while the source terminal transmits the source message; and continuing to enable a communication function for communicating with the sink terminal and continuing to transmit the bus voltage to the sink terminal by the source terminal when the source terminal receives the request message;

wherein the source message is used to query at least one of a voltage and a current corresponding to the sink terminal, and the request message is used to reply at least one of the voltage and the current corresponding to the sink terminal;

the source terminal starts to transmit the bus voltage at a first time;

the source terminal starts to transmit the source message to the message transceiver of the sink terminal at a second time;

the message transceiver of the sink terminal starts to transmit the request message to the source terminal at a third time; and the first time precedes the second time, the second time precedes the third time, a first period between the second time and the third time is shorter than a second period of transmitting the source message by the source terminal.

2. The control method of claim 1, wherein whether the sink terminal has entered the sink attached state is determined by the sink terminal.

3. The control method of claim 1, wherein the sink terminal receives the bus voltage from the source terminal through a bus voltage path between the sink terminal and the source terminal.

4. The control method of claim 3, wherein the source terminal transmits the source message to the sink terminal through a configuration channel path between the sink terminal and the source terminal, the message transceiver of the sink terminal transmits the request message to the source terminal through the configuration channel path, and the configuration channel path is different from the bus voltage path.

5. The control method of claim 1, wherein the message transceiver transmits the request message to the source terminal when the sink terminal has received the bus voltage, and a controller of the sink terminal has not completed a wake-up operation.

6. A control method for a charging system, the charging system comprising a source terminal and a sink terminal, the control method comprising:
   transmitting a bus voltage by the source terminal;
   determining whether the sink terminal has entered a sink attached state when the sink terminal receives the bus voltage;
   starting timing when determining the sink terminal has entered the sink attached state;
   enabling a message transceiver of the sink terminal after a predetermined period has elapsed since determining the sink terminal has entered the sink attached state;
   transmitting a source message to the transceiver of the sink terminal by the source terminal;
   transmitting a request message to the source terminal by the message transceiver of the sink terminal while the source terminal transmits the source message; and
   continuing to enable a communication function for communicating with the sink terminal and continuing to transmit the bus voltage to the sink terminal by the source terminal when the source terminal receives the request message;
   wherein the source message is used to query at least one of a voltage and a current corresponding to the sink terminal, and the request message is used to reply at least one of the voltage and the current corresponding to the sink terminal.

7. The control method of claim 6, wherein the predetermined period is shorter than a second period during which the source message is transmitted by the source terminal.

8. The control method of claim 6, wherein the predetermined period is between 0 and 6 seconds.

9. The control method of claim 6, wherein the predetermined period is between 0 and 3 seconds.

10. The control method of claim 6, wherein the predetermined period is timed by a timer of the sink terminal.

11. A charging system, comprising:
    a source terminal configured to transmit a bus voltage and a source message, and receive a request message; and
    a sink terminal electrically connected to the source terminal, and configured to receive the bus voltage and the source message, and transmit the request message to the source terminal while the source terminal transmits the source message;
    wherein the source message is used to query at least one of a voltage and a current corresponding to the sink terminal, the request message is used to reply at least one of the voltage and the current corresponding to the sink terminal, and the source terminal continues to enable a communication function for communicating with the sink terminal and continues to transmit the bus voltage to the sink terminal when the source terminal receives the request message;
    the source terminal starts to transmit the bus voltage at a first time;
    the source terminal starts to transmit the source message to a first message transceiver of the sink terminal at a second time;
    the first message transceiver of the sink terminal starts to transmit the request message to the source terminal at a third time; and
    the first time precedes the second time, the second time precedes the third time, a first period between the second time and the third time is shorter than a second period of transmitting the source message by the source terminal.

12. The charging system of claim 11, wherein:
    the sink terminal comprises:
        a first power unit configured to receive the bus voltage to supply power to the sink terminal; and
        the first message transceiver configured to receive the source message and transmit the request message;
    the source terminal comprises:
        a second power unit configured to transmit the bus voltage; and
        a second message transceiver configured to transmit the source message and receive the request message; and
    the charging system further comprises:
        a configuration channel path electrically connected to the first message transceiver and the second message transceiver, and configured to transmit the source message and the request message; and
        a bus voltage path electrically connected to the first power unit and the second power unit, and configured to transmit the bus voltage.

13. The charging system of claim 12, wherein the sink terminal further comprises:
    a timer electrically connected to the first message transceiver, and configured to start timing when the first power unit has received the bus voltage and the sink terminal has entered the sink attached state, and transmit an enabling signal to enable the first message transceiver after a predetermined period has lapsed;
    wherein the first message transceiver transmits the request message to the source terminal after being enabled, and the predetermined period is shorter than the second period during which the source message is transmitted by the source terminal.

14. The control system of claim 13, wherein the predetermined period is between 0 and 6 seconds.

15. The control system of claim 13, wherein the predetermined period is between 0 and 3 seconds.

16. The charging system of claim 12, wherein:
    the first message transceiver comprises a first low-drop regulator configured to transmit the request message; and
    the second message transceiver comprises a second low-drop regulator configured to transmit the source message.

* * * * *